United States Patent
Neumann

[15] 3,695,008
[45] Oct. 3, 1972

[54] ROLLER STRIP FILTER FOR PURIFYING AIR OR GASES

[72] Inventor: Gerhard Neumann, Berlin, Germany

[73] Assignee: Delbag-Luftfilter Gesellschaft mit beschrankter Haftung, Berlin, Germany

[22] Filed: Jan. 15, 1970

[21] Appl. No.: 2,995

[30] Foreign Application Priority Data

Jan. 21, 1969 Germany............G 69 02 635
Jan. 21, 1969 Germany............G 69 02 636
Jan. 21, 1969 Germany............G 69 02 637

[52] U.S. Cl. .....................55/354, 55/484, 55/501
[51] Int. Cl. ...........................................B01d 25/24
[58] Field of Search..................55/351–354, 484, 55/501

[56] References Cited

UNITED STATES PATENTS

| | | |
|---|---|---|
| 1,402,101 | 1/1922 | Smith.....................55/354 |
| 3,003,582 | 10/1961 | Palmore..................55/354 |
| 3,280,539 | 10/1966 | Parrott....................55/354 |
| 3,359,709 | 12/1967 | Revell.....................55/354 |
| 3,552,101 | 1/1971 | Papp.......................55/354 |
| 3,559,380 | 2/1971 | Neumann................55/354 |

*Primary Examiner*—Bernard Nozick
*Attorney*—Karl F. Ross

[57] ABSTRACT

A roller-strip filter for air or gas purification, which can be easily disassembled, consists of two units separable from each other. The first unit comprises a mounting framework, seals for the filter strip and support grids for backing the filter strip, guide rollers for the filter strip; the second unit comprises feed and wind-up rollers for moving the filter strip and a drive unit for rotating the wind-up roller, whereby the more delicate components can be mounted in the filter framework after fitting the framework to a wall portion or the like.

23 Claims, 17 Drawing Figures

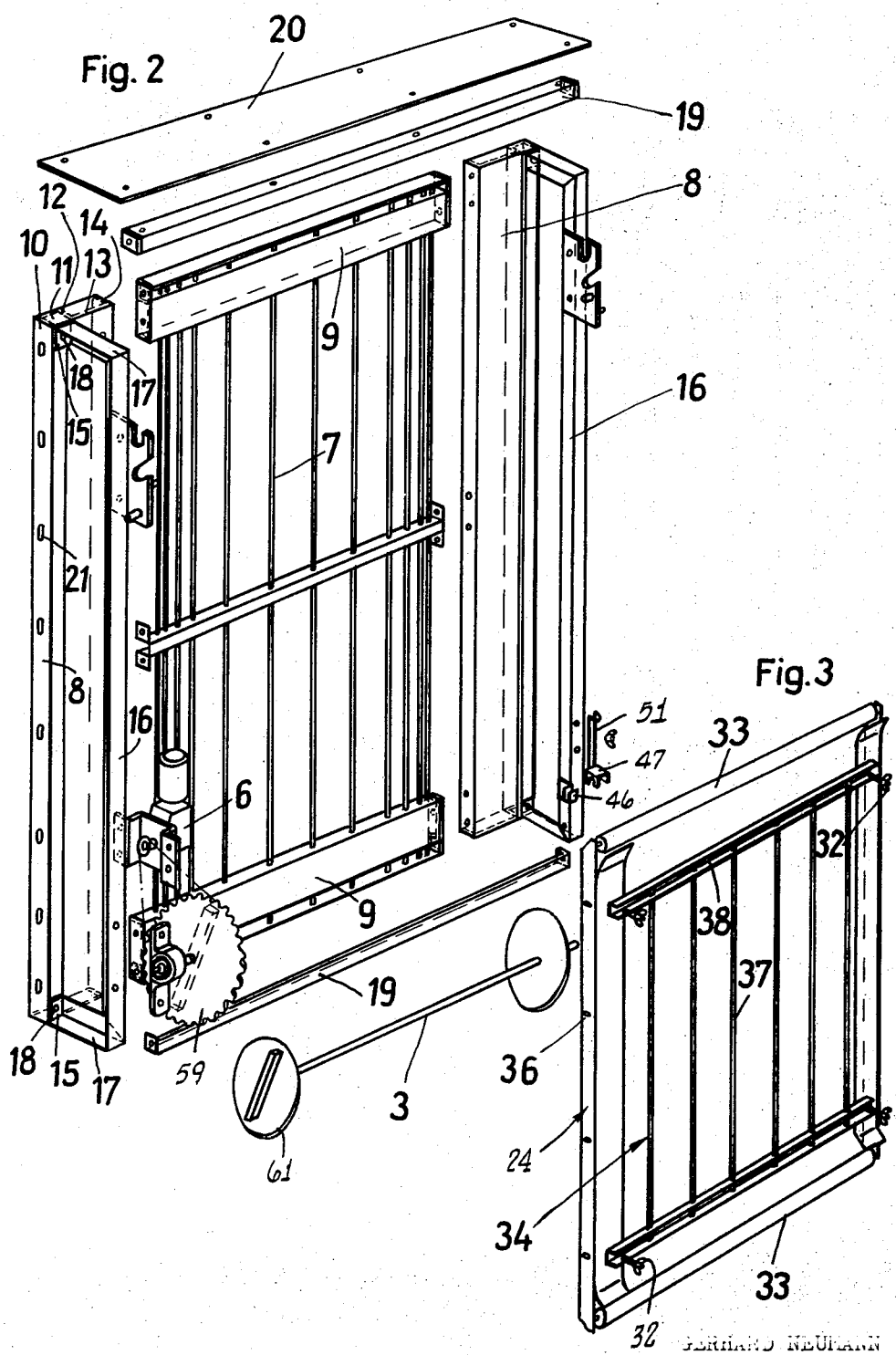

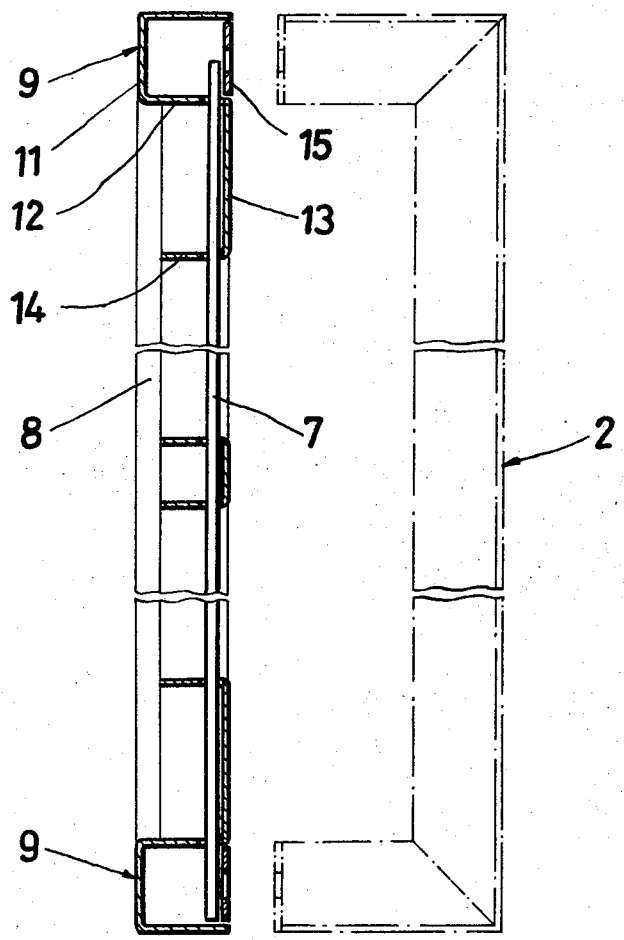

PATENTED OCT 3 1972
3,695,008
SHEET 5 OF 9
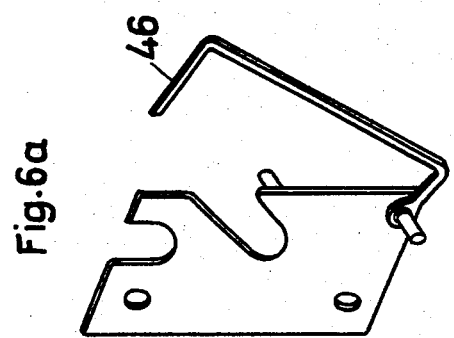
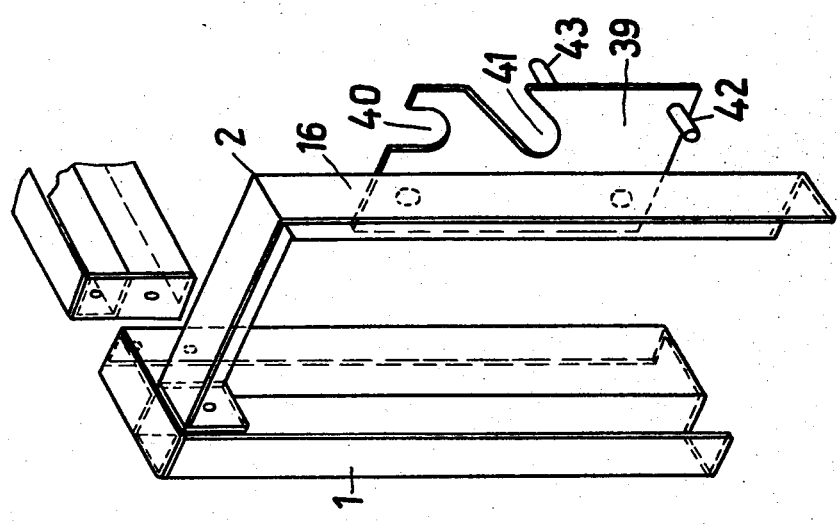
Inventor: GERHARD NEUMANN
BY Karl J. Ross
ATTORNEY

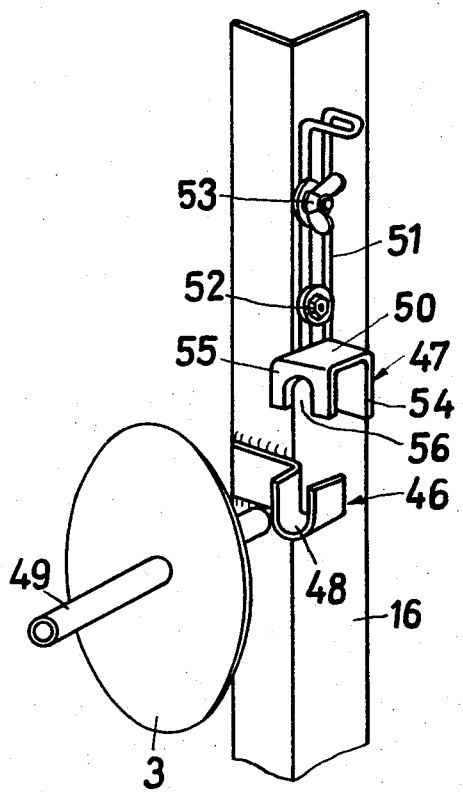

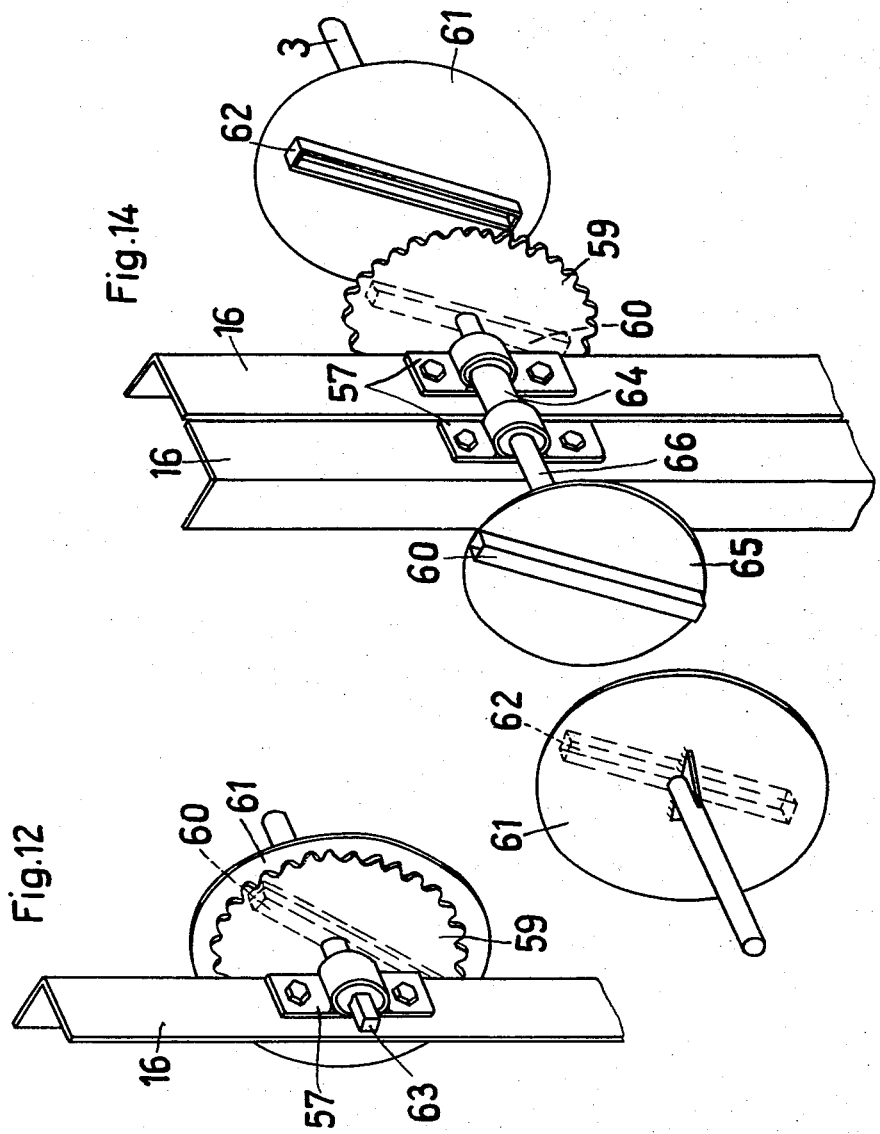

ROLLER STRIP FILTER FOR PURIFYING AIR OR GASES

My present invention relates to a roller-strip filter.

Such filters are used for purifying atmospheric air, for example in air-conditioning systems, and are as a rule arranged in a wall opening. They have an upper or feed roller and a lower or wind-up roller driven intermittently by a drive mechanism. The wind-up roller draws a filter strip over a filter surface lying between the two rollers. The filter strip is held on both sides by support grids between the two rollers to prevent the strip from bulging out of its plane of motion. Conventional roller-strip filters have casings in which all the functional components of the filter are preassembled at the factory. The completely assembled roller-strip filter is transported to the place of installation from the factory in order to be fitted in the wall opening. With these roller-strip filters it is necessary to use a special mounting framework since, as they lack attachment flanges, they cannot be fitted directly into a wall opening. Besides, as a result of the work on the wall and plaster, there is a danger of the somewhat sensitive functional components becoming dirty and being damaged. Apart from these disadvantages the production and transport costs for these known roller-strip filters in the assembled state are considerable; construction of the casing and the installation of the functional components entail considerable mounting time and costs. Known roller-strip filters with mounting frameworks are not universally applicable, e.g., for devices lying on end. If it is required to insert a new feed roller with filter strip in the roller-strip filter, the new roller has to be fitted in the holder upon removal of the empty feed roller. The filter strip is then threaded over the upper deflecting roller between the support grids until it can be fixed to the lower roller. Inserting the full feed roller into its holder and threading the filter strip between the support grids is difficult in the case of conventional roller-strip filters, particularly because the full feed roller is in its operational position and therefore there is very little room for threading the filter strip.

The wind-up roller is driven intermittently by a drive system, held in the framework forming the housing, through the intermediary of a roller sprocket acting on a chain wheel of the wind-up roller; it draws off from the upper roller the necessary length of filter strip when the part of the filter strip between the support grids has all been used up by impurities from the air. The need for rapidly replacing the driven wind-up roller in such filters involves a not inconsiderable cost with regard to the both drive itself and the required rapidly releasable mounting for the wind-up roller. Exchanging the wind-up roller itself in that case is difficult and costly and takes a relatively long time which is a special disadvantage since the strip filter does not operate during the replacement. In various known constructions either each individual roller-strip filter is provided with its own drive, which in the case of large installations with several roller-strip filters in series causes an unnecessary expense, or two roller-strip filters can be driven by the drive system by means of intermediate coupling components. However, in most cases these coupling components are too costly and do not allow the drive arrangement to be modified.

Objects of the invention are to avoid these disadvantages and to produce a roller-strip filter which is inexpensive in construction, is universally applicable and can be fitted into a wall opening in various assembly stages along with its mounting framework without danger of damaging or dirtying the important functional components of the filter, which enables a simple mounting for the strip rollers and simplifies the work of threading the filter strip, which is distinguished by a simple and cheap construction of the feed roller and its mounting, which facilitates rapid exchange with reliable operation, and which allows two adjacent or interconnected roller-strip filters to be actuated simultaneously by a common drive system fitted to one filter.

The roller-strip filter according to my invention includes a first unit and a second unit, the first unit comprising a mounting framework, a sealing profile mountable thereon at either side of the filter strip, support grids for either side of the filter strip, and deflecting rollers for the filter strip; the second unit comprises a support for a wind-up roller and a feed roller as well as a drive unit for driving the wind-up roller.

By dividing the conventional casing in accordance with the invention into a mounting framework and a roller support with the functional components fixed to it, the mounting costs, the production costs and the assembly costs and time may be considerably reduced. The mounting framework may be fitted directly into the wall opening. When the subsequent plastering has been completed, the sealing profile, the support grids and the deflecting rollers for the filter strip can be arranged in the mounting framework. The mounting framework could also be installed together with its associated functional components in the wall opening. The functional components carried on the support may be preassembled at the factory ready for operation so that little work is involved in assembling the mounting framework and the support at the place of use.

The mounting framework may be made up of an angled profile in the form of a double channel with parallel free edges facing in opposite directions, the profile forming two longitudinal rails with the same cross section and an upper and a lower transverse rail connected thereto. The inside channel portion of the rails may have a central web which is wider than that of the outside channel portion and serves as a backstop for the longitudinal edges of the filter strip. Thanks to the use of this special angled profile the production costs for the simple mounting framework are very low. The mounting framework may be fixed in a wall opening by the central web of the outer channel portion of the rail at the ends of the longitudinal rails; the leg of the outer channel portion has bridging tongues for engaging the support. In addition the blacking grid on the air exhaust side may be held in the transverse upper and lower rails of the mounting framework. The two lateral sealing profiles for the filter strip may each consist of an angle iron which can be fixed with one leg by way of slots to the common leg of the two channel portions of the longitudinal rails of the mounting framework so as to be adjustable in a direction perpendicular to the filter strip. The free leg of the sealing profile may terminate in a bend lying with its front edge on the filter strip and may have its central region braced by a spring against the central web of the inside channel portion of the mounting framework, the spring surrounding a bolt for adjusting the sealing profile to the thickness of the filter strip. By virtue of the arrangement and design of the sealing profile in accordance with the invention the roller strip filter can be adapted very easily to filter strips of varying thickness, reliable and dependable sealing of the advancing filter strip against air leakage being ensured in every case. In addition the sealing profiles may form the longitudinal sides of the air-intake side of the support grid and at their two ends carry the deflecting rollers for the filter strip, the rods of the air-intake side of the support grid being held in transverse channels fixed to the upper side of the free leg of the sealing profile. The special design of the sealing profile as side parts of the support grid carrying the deflecting rollers ensures that, upon adjustment to a given filter-strip thickness, simultaneously and automatically the support grid and the upper and lower deflecting rollers are adjusted to the same extent.

The support may consist of two angle-iron members to be fixed to the tongues of the outer channel portions of the longitudinal rails of the mounting framework, which may be interconnected by cross rods engaging the ends of the central webs. Using angle irons for the support lowers the cost and simplifies handling and mounting. The central webs of the members may support the drive system, the feed and wind-up rollers and a cover plate. The free legs of the outer channel portions of the longitudinal rails of the mounting framework may have elongated screw holes for joining together two adjacent mounting frameworks.

Furthermore, in the upper region of the rear side of the housing or framework construction there may be fixed a pair of retaining lugs projecting from the longitudinal sides perpendicularly to the axis of the feed roller and having in their upper edges a vertical or approximately vertical recess acting as a bearing for the shaft of the feed roller; their front edges may be provided below that recess with a second recess extending obliquely upwardly to serve as a temporary rest for the full feed roller while the filter strip is being inserted between the support grids. Thus, the filter strip can be easily threaded into the support grids from the full roller. To do this the full roll is first placed in the obliquely sloping recesses in the front edges of the lugs. The roller is thus below its operational position so that there is sufficient space for handling the filter strip during the process of threading it in. Once the filter strip has been inserted and taken up by the lower wind-on roller, the full feed roller is simply moved out of the obliquely sloping recesses into the recesses in the upper edges of the lugs; the fed roller is then in the correct operational position. When exchanging an empty feed roller for a full one, the empty one merely has to be removed from the recesses in the upper edges of the lugs; the full feed roller may now be placed in the oblique recesses of the lugs, the filter strip may then be fed in and the full feed roller is thereupon lodged in the vertical recesses for operation. These lugs may each have a resilient latch which may be positioned to pivot on a pin when the roller-strip filter is to lie face down. In this case the feed roller cannot fall out of the recess in the lug.

The feed roller on the dirty-air side of the retaining lugs may have the lower part of their outer surfaces provided with projecting pins serving as rocker bearings for a domed cover. With the lugs and below their oblique recesses there may be pins projecting at right angles for anchoring a tension spring whose other end is attached to the domed cover. In the case of roller-strip filters in which the wind-up and feed rollers are located on the dirty-air side, the upper or feed roller should be protected from the effects of the dusty air by the aforementioned dome cover. The arrangement just described makes it easy to handle the domed cover during the exchange process; in operation the domed cover is held in the closed position by the force of the springs whereas when the cover is tipped back still tensioned springs are in a dead-center portion.

If the feed roller lies on the clean-air side downstream of the air flow, the pins acting as rocker bearing and the pins engaging the tension springs may be arranged on lugs projecting beneath the bearings for the feed roller.

The sprocket-wheel of the chain drive may be held with its axle in a bearing positioned on the outside of one of the longitudinal members of the framework and may be provided at its exposed face with a diametrically extending coupling bar of U-shaped or preferably rectangular cross section; the wind-up roller can carry at one end of its shaft an entrainment disc having on its free surface a complementarily shaped coupling element engageable with the bar, the other end of its shaft being releasably held in a bearing on the opposite longitudinal member of the framework.

The cast or plastic bearing for the roller shaft may comprise a lower U-shaped upwardly open part fixed to the longitudinal member for taking the roller shaft and a U-shaped downwardly open upper part offset by 90° from the lower part, movable on the longitudinal member in a vertical direction and fitting in its closed bearing position over the lower part; the rear arm of this upper part acts as a stop for the free end of the roller shaft, its front arm having a downwardly open recess of a length equalling the diameter of the roller shaft.

The upper slidable bearing part may have fixed to its central web an upstanding, vertically displaceable mounting loop guided by a fastening screw.

The free end of the sprocket wheel shaft may be in the form of a four-cornered stud projecting from the bearing, which can be coupled by a four-cornered sleeve with the four-cornered shaft of a drive plate having a U-shaped projection engageable with the wind-up roller of an adjoining strip filter.

In the accompanying drawing:

FIG. 2 shows a perspective exploded view of the mounting framework and of the support of my improved filter;

FIG. 3 shows a perspective view of the support grid carrying the deflecting rollers;

FIG. 5 shows a cross-sectional elevation of the mounting framework and a diagrammatic side view of the support;

FIG. 6 shows a perspective view of a lug fixed to the framework as a holder for the upper or feed roller;

FIG. 6a shows a perspective view of the lug with locking bar;

FIG. 11 shows a magnified perspective view of the bearing for the shaft of the wind-up roller;

FIG. 12 shows a perspective view of the driving sprocket wheel of the wind-up roller;

FIG. 14 shows a perspective exploded view of the elements of FIG. 13 drawn to a larger scale.

Figure 1:
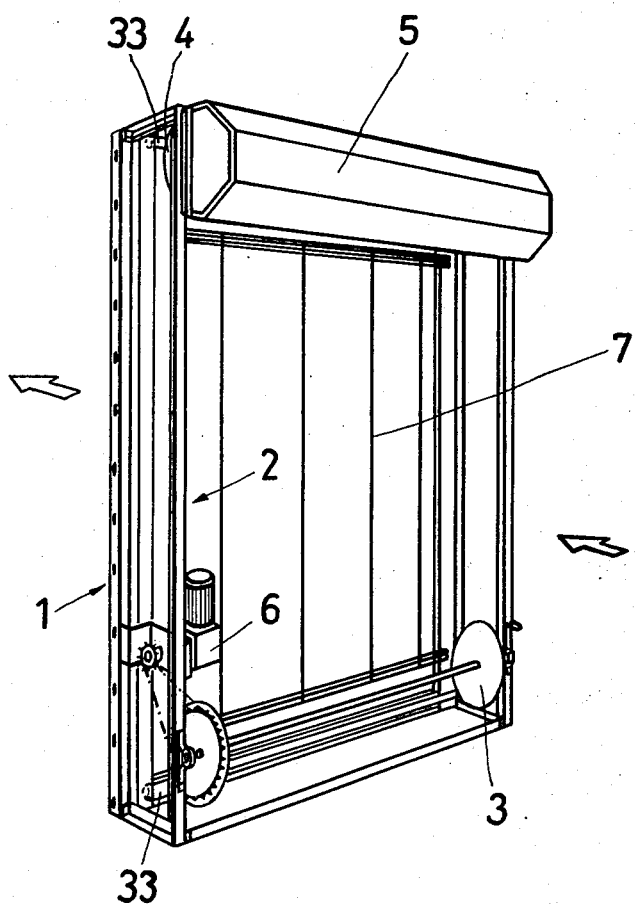
FIG. 1 shows a schematic perspective view of a roller-strip filter embodying my invention.

FIG. 1 shows the mounting framework 1, the carrier support 2, the lower or wind-up roller 3, the upper or feed roller 4, the domed cover or hood 5, the drive system 6 for the wind-up roller and one support grid 7 of my improved filter. As can be seen from FIGS. 2, 4 and 5, the mounting framework 1 comprises longitudinal rails 8 and transverse rails 9. The rails 8 and 9 have a generally S-shaped channel profile, as shown more clearly in FIG. 4. The outside channel section or "U" of the profiled rail has a free leg 10, a central web 11 and a leg 12 attached to a central web 13 of the inside channel section or "U" which ends in a free leg 14. The outside channel section of the longitudinal rails 8 is closed above and below by a bridgeing tongue or plate 15 which serves for attaching the support 2 to the frame 1.

The support 2 comprises two bail-shaped upright members 16 of angle iron whose angularly bent extremities 17 are attached by means of transverse lugs 18 thereof to the bridge plates 15 of the longitudinal rails 8 of the mounting framework 1. The two uprights 16 of the support framework 2, joined together by cross bars 19, carry on their central webs the drive system 6, the roller 4 and the domed cover 5 not depicted in FIG. 2.

Figure 4:
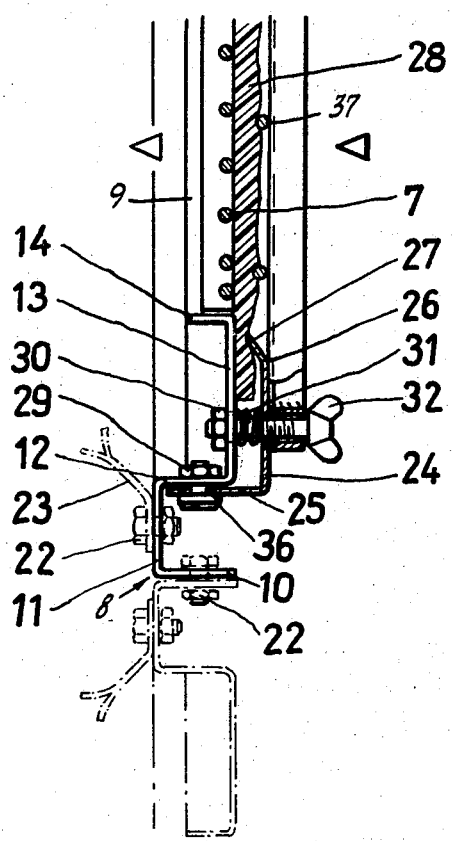
FIG. 4 shows a cross section through the mounting framework with the support grids and sealing elements.
Figure 7:
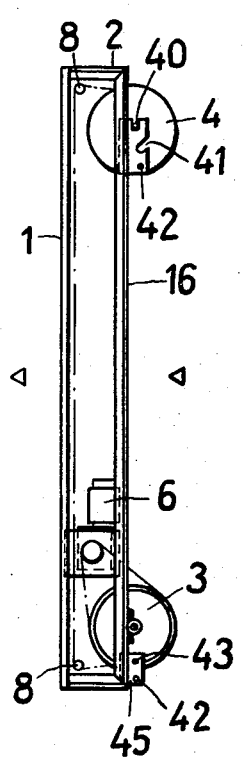
FIG. 7 shows a diagrammatic side view of the roller-strip filter without hood.

As FIGS. 2 and 4 show, the legs 10 of the outside channel sections of the longitudinal rails 8 of the mounting framework 1 have screw holes 21 through which, as can be seen in particular from FIG. 4, the legs 10 of two adjacent mounting frameworks can be joined together be screws 22 to form one unit. As FIG. 4 shows, the central web 11 of the outside channel section of the rails 8, 9 lies against a wall to which the mounting framework 1 is anchored by clamps 23. Fitted to the assembled mounting framework 1 and support 2 is an upper cover plate 20 which protects the roller-strip filter from foreign bodies (e.g. dust) falling in.

As FIG. 4 further shows, the sealing profile 24 consists of an angle iron, one arm 25 of which lies against the common leg 12 of the S-profile 10–14 while its other arm 26 forms a pressure bar which extends over the web 13 of the inside channel section of the longitudinal rail 8. At its free edge the arm 26 has a bend 27 which bears upon the front face of the filter strip 28 and holds it tight against the surface of web 13. The arm 25 has a slot 36 traversed by a screw 29 whereby the sealing profile 24 is adjustably mounted on the member 8. Fixed to the central web 13 is a screw bolt 30 which passes through the arm 26 of the sealing profile 24 with interposition of a spring 31. The effective depth sealing profile is adjusted by operating a wing nut 32 engaging screw bolt 30.

The vertical guide rods of grid 7 are received, as FIG. 4 shows, in the cross rails 9 of the mounting framework. The other support grid 34 (FIG. 3), carrying the deflecting rollers 33 for the filter strip 28, comprises vertical guide rods 37 held by horizontal channel rails 38 on the vertical profiles 24 which simultaneously form the carriers 25 for the whole functional unit. In the ends of the flanges 25 of profiles 24 are mounted the deflecting rollers 33.

In assembling the roller-strip filter at the place of use, the mounting framework 1, with its rectangular structure 8, 9 spanned by rods 7 and the support grid 34 carried on the sealing profiles 24 along with the deflecting rollers 33 is fixed in front of or in the nonillustrated wall opening which is traversed by the airstream to be filtered. The support 2 with the drive system 6, the rollers 3, 4 and the domed cover 5 is then fixed thereto by the brackets 15 of the longitudinal rails 9 of the mounting framework 1. After threading the filter strip 28 between the support grids 7 and 37 and winding it onto the wind-up roller 3, the roller-strip filter is ready for operation.

Figure 8:
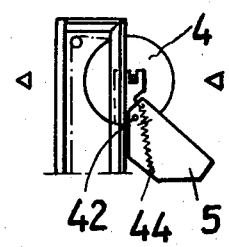
FIG. 8 shows the upper part of FIG. 7 together with a domed cover or hood for the upper roller in open position.
Figure 8A:
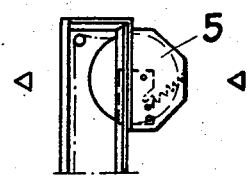
FIG. 8a is a view similar to FIG. 8 with the hood closed.

As FIG. 6 shows for one of the two upright members 16, each of these members carries, a projecting lug or plate 39. In its upper edge the plate has a recess or notch 40 which ends in a semi-circle and acts as a rest or bearing for the shaft of the feed roller 4. In the front edge of the plate 39 underneath the recess 40 there is a recess or slot 41 sloping obliquely upwards to receive the pay-off roll 4 while the filter strip is being threaded between the support grids 7 and 34. Projecting horizontally from the outside of the plate 39 is a lower pin 42 which serves as rocker bearing for the domed cover or hood 5. On the inside of the plate 39, below the recess 41 and above the pin 42, there is a projecting pin 43 to which is fixed a tension spring 44 attached by its other end to the domed cover 5, as shown in FIG. 8. Here the feed roller is on the dirty-air or upstream side of the roller-strip filter and is protected from the effects of the dusty air by the closed hood 5. In cases where the filter lies flat a resilient, generally L-shaped latch 46 (FIG. 6a) is pivoted on the pin 42 to close off the recesses 40 and 41 when the latch is swung up.

Figure 9:
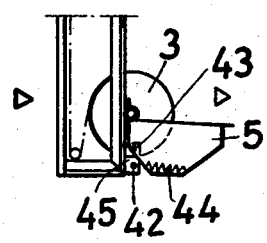
FIG. 9 shows the lower part of FIG. 8 together with a domed cover or hood for the lower roller in open position.
Figure 9A:
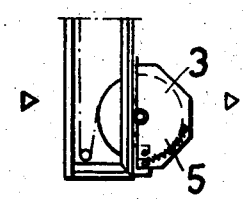
FIG. 9a is a view similar to FIG. 9 with the hood closed.

When the rollers 3, 4 are arranged on the clean-air or downstream side (FIG. 9), the lower or wind-up roller 3 has to be protected from the dusty air. In this case the domed cover 5 engages lugs 45 each fixed to a respective bar 16 beneath the bearing for the wind-up roller 3 and carrying the pivot pin 42 as well as the anchor pin 43. In this way the roller-strip filter in accordance with the invention can be used as desired, with the rollers either on the upstream side or on the downstream, with one and the same domed cover.

Figure 10:
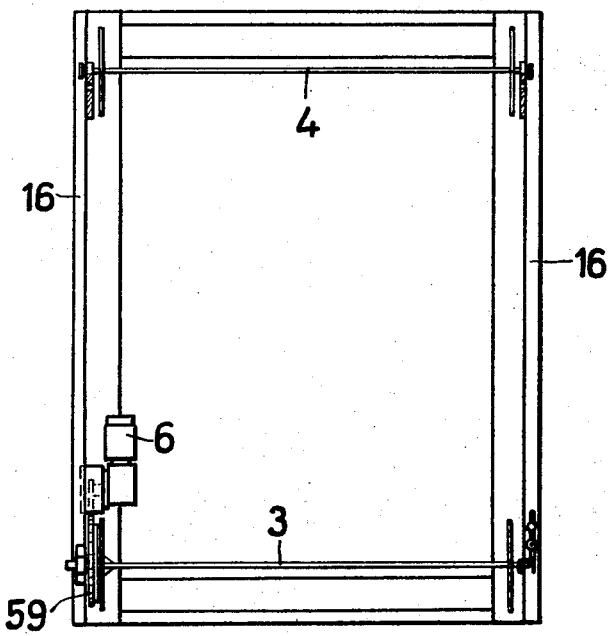
FIG. 10 shows a diagrammatic face view of the assembly of FIG. 1.

As FIG. 11 shows, the right-hand longitudinal member 16 seen in FIGS. 1 and 10 carries a lower bearing part 46 and an upper bearing part 47. The lower part 46 has a strip 48 bent into a U open at the top into which is inserted the end 49 of the shaft of the wind-up roller 3. The upper part 47 is likewise U-shaped but is turned through 90° with respect to the lower part 46. Fixed to the central web 50 of the upper bearing part 47 is a vertical loop 51; positioned on the upright 16 are a fixing screw 52 and an adjusting screw 53 which allow the upper bearing part to be adjusted in a vertical direction. FIG. 11 depicts the bearing parts 46, 47 in the open position. When a new wind-up roller 3 is inserted into the lower bearing part 46, the upper bearing part 47 is slid downwards with its rear leg 54 acting as an end stop for the end 49 of the roller shaft while a downwardly open recess 56 in the front leg 55 fits over the end 49 whereby the wind-up roller 3 is held securely in the bearing parts 46, 47 without being able to slip sideways or longitudinally in an on-edge position. Upon a lowering of bearing half 47 into its shaft-retaining position, bearing half 48 is straddled by the recessed leg 55 and the solid leg 54 which are spaced apart in the axial direction of the roller shaft.

Figure 13:
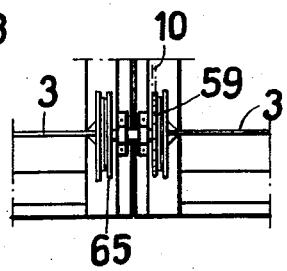
FIG. 13 shows a partial view of two wind-up rollers coupled together.

FIGS. 12 to 14 show the design of the drive system and the other side of the wind-up roller 3. FIG. 12 shows that the shaft of the sprocket wheel 59 is held in a bearing 57 on the upright 16. The exposed front surface of the sprocket wheel has a diagonal rib 60. On the adjacent end of the wind-up roller 3 there is provided an entrainment disc 61 which has a box-shaped, forwardly open projection 62 with a closed periphery which engages the rib 60 so that the wind-up roller 3 is positively entrained by the drive sprocket 59. Since the rear arm 54 of the upper bearing part 47 prevents the wind-up roller from shifting axially, the box-like projection 62 of the end disc 61 cannot under any circumstances become disengaged from the projection 60 of the drive wheel 59 during operation, i.e., when the bearing parts 46, 47 are closed. When it is necessary to change the wind-up roller all that has to be done is to raise the upper bearing part 47 from the closed position into the position shown in FIG. 11. Then the wind-up roller 3 can first be displaced axially and withdrawn from the projection 60 and the be released from the lower bearing part 48. When inserting a new empty wind-up roller, the box-like projection 62 of the end disc 61 is fitted over the projection 60 of the drive wheel 59 and the shaft end 49 is inserted into the lower bearing part 46, after which whereupon the upper bearing part 47 is pushed down from the open position in FIG. 11 into the closed position. In this way the wind-up roller 3 is securely held by the bearing 46, 47 against axial and lateral displacement.

As FIG. 12 shows, the stub shaft of the sprocket wheel 59 has a four-cornered extremity 63 extending out of the bearing 57 almost to the outside edge of the longitudinal member 16. When two roller-strip filters are mounted side by side, a stub shaft 66 of a coupling disc 65 is simply inserted into the bearing 57 in the adjoining upright 16 of the adjacent roller-strip filter, the shaft of this disc likewise having a four-cornered mating extremity. The coupling disc 65 has a bar-shaped diametrical rib 60 similar to that of the wheel 59. The two four-cornered shaft ends 63 have fitted over them a four-cornered sleeve 64 so that the disc 65 is coupled with the wheel 59.

The construction in accordance with the invention allows rapid interchange of the wind-up roller as well as convenient interconnection of the wind-up rollers of two adjacent roller-strip filters so that they can be operated by one and the same drive system.

I claim:

1. A roller-strip filter comprising:

a mounting framework fitting into a wall opening, said framework including a rectangular structure with a pair of vertical member and a pair of transverse horizontal members surrounding an air passage, said vertical members defining a pair of coplanar sealing surfaces on opposite sides of said air passage;

strip-guiding means on said structure including a pair of grids spanning said air passage with sufficient separation to form a path therebetween for a vertically movable filter strip advancing across said opening along said sealing surfaces;

a pair of uprights provided with fastening means removably attaching same to said vertical members outside said sealing surfaces;

a feed roller supplying said filter strip and having a first horizontal shaft journaled on said uprights adjacent one of said horizontal members;

a wind-up roller taking up said filter strip and having a second horizontal shaft journaled on said uprights adjacent the other of said horizontal members;

drive means for said second shaft on one of said uprights; and a pair of pressure elements carried on said framework for holding the lateral edges of said filter strip tight against said sealing surfaces.

2. A filter as defined in claim 1 wherein said pressure bars are parts of a pair of angled profiles having other parts adjustably mounted on said vertical members, one of said grids comprising a set of vertical rods mounted on said horizontal members, the other of said grids comprising a set of rods carried on cross bars interconnecting said profiles.

3. A filter as defined in claim 2 wherein said vertical members are profiled bars of generally S-shaped profile with intermediate legs secured to said other parts and with webs spacedly overlain by said pressure bars.

4. A filter as defined in claim 3 wherein said webs are provided with spring-loaded clamping bolts engaging said pressure bars for selective adjustment of the spacing between said webs and said pressure bars.

5. A filter as defined in claim 3 wherein said profiled bars form channels open toward said uprights and provided with bridging formations engaging said uprights at the top and the bottom thereof.

6. A filter as defined in claim 5 wherein said uprights are bail-shaped members with bent-over top and bottom extremities terminating in transverse lugs secured to said bridging formations.

7. A filter as defined in claim 1 wherein said uprights are bail-shaped members with bent-over top and bottom extremities fastened to said vertical members, further comprising cross braces interconnecting said uprights at corners formed by said bent-over extremities.

8. A filter as defined in claim 7 wherein said uprights are provided near said top extremities with lugs projecting away from said framework and forming rests for the ends of said first shaft.

9. A filter as defined in claim 8 wherein said lugs have upper edges provided with vertical notches constituting said rests.

10. A filter as defined in claim 8 wherein said lugs have vertical edges provided with downwardly slanting recesses constituting alternate rests adapted to receive the ends of said first shaft during insertion of a filter strip from said pay-off roller between said grids.

11. A filter as defined in claim 10 wherein said lugs are provided with generally L-shaped latches swingable into positions obstructing said notches and said recesses.

12. A filter as defined in claim 8, further comprising a hood for said pay-off roller pivotally mounted on said lugs.

13. A filter as defined in claim 12, further comprising tension springs anchored to said lugs and to said hood for urging same into a closed position.

14. A filter as defined in claim 7 wherein the other of said uprights is provided near its bottom extremity with a fixed, upwardly open bearing half for an end of said second shaft and with a complementary, vertically movable bearing half.

15. A filter as defined in claim 14, further comprising fastening means engageable with said complementary bearing half for fixing same in a shaft-retaining position.

16. A filter as defined in claim 15 wherein said complementary bearing half forms an end stop for said second shaft.

17. A filter as defined in claim 16 wherein said complementary bearing half has two depending legs spaced apart in the axial direction of said second shaft, said legs bracketing said upwardly open bearing half in said shaft-retaining position, one of said legs having a bottom recess giving clearance to said second shaft, the other of said legs being solid and constituting said end stop.

18. A filter as defined in claim 14 wherein said drive means comprises a motor-driven wheel coaxial with said second shaft, the latter being provided with a disk adjacent said wheel, said wheel and said disk having confronting surfaces provided with mating formations for positively coupling said second shaft to said wheel upon the remote end thereof engaging said end stop.

19. A filter as defined in claim 18 wherein said mating formations include a diametrical rib on one of said confronting surfaces and a complementary box-shaped diametrical projection on the other of said confronting surfaces.

20. A filter as defined in claim 18 wherein said wheel is provided with sprocket teeth engageable by a drive chain.

21. A filter as defined in claim 18, wherein the upright carrying said wheel is juxtaposed with a similar upright on an adjoining second framework, further comprising coupling means on said similar upright engageable with said wheel for entraining another wind-up roller on said second framework.

22. A filter as defined in claim 21 wherein said coupling means comprises a second disk having a stub shaft aligned with a stub shaft of said wheel, said stub shafts being releasably interconnected for joint rotation.

23. A filter as defined in claim 22 wherein said stub shafts are provided with polygonal ends confronting each other and with a complementary connecting sleeve engaging said polygonal ends.

* * * * *